(12) United States Patent
Glasgow et al.

(10) Patent No.: US 10,078,440 B2
(45) Date of Patent: Sep. 18, 2018

(54) MEDIA DISCOVERY AND CONTENT STORAGE WITHIN AND ACROSS DEVICES

(71) Applicant: eBay Inc., San Jose, CA (US)

(72) Inventors: Dane Glasgow, Los Altos, CA (US); David Ramadge, San Jose, CA (US); Matthew Bret MacLaurin, Santa Cruz, CA (US); Justin Van Winkle, San Jose, CA (US)

(73) Assignee: eBay Inc., San Jose, CA (US)

( * ) Notice: Subject to any disclaimer, the term of this patent is extended or adjusted under 35 U.S.C. 154(b) by 522 days.

(21) Appl. No.: 14/668,350

(22) Filed: Mar. 25, 2015

(65) Prior Publication Data

US 2016/0283519 A1    Sep. 29, 2016

(51) Int. Cl.
| | | |
|---|---|---|
| *G06F 11/34* | (2006.01) | |
| *G06F 3/0488* | (2013.01) | |
| *G06F 3/0485* | (2013.01) | |
| *G06K 9/62* | (2006.01) | |
| *G06F 3/0481* | (2013.01) | |
| *G06F 3/0483* | (2013.01) | |
| *G06F 17/30* | (2006.01) | |

(52) U.S. Cl.
CPC .......... *G06F 3/0488* (2013.01); *G06F 3/0481* (2013.01); *G06F 3/0483* (2013.01); *G06F 3/0485* (2013.01); *G06F 3/04855* (2013.01); *G06F 17/30265* (2013.01); *G06F 17/30274* (2013.01); *G06K 9/6278* (2013.01); *G06F 11/3438* (2013.01); *G06F 17/30064* (2013.01)

(58) Field of Classification Search
CPC ......... G06F 17/20064; G06F 17/30247; G06F 17/3005; G06F 11/3438
See application file for complete search history.

(56) References Cited

U.S. PATENT DOCUMENTS

| | | | | |
|---|---|---|---|---|
| 6,847,733 | B2* | 1/2005 | Savakis | G06F 17/30247 382/203 |
| 7,353,241 | B2* | 4/2008 | Erlingsson | G06F 11/1469 |
| 7,864,352 | B2* | 1/2011 | Hull | G06F 3/1206 235/379 |
| 2007/0271297 | A1* | 11/2007 | Jaffe | G06F 17/30041 |
| 2008/0180391 | A1* | 7/2008 | Auciello | G06F 3/1423 345/156 |
| 2008/0294663 | A1* | 11/2008 | Heinley | G06F 3/0481 |
| 2010/0303342 | A1* | 12/2010 | Berg | G06F 17/30247 382/155 |

FOREIGN PATENT DOCUMENTS

JP          2013073608 A    *   4/2013

* cited by examiner

*Primary Examiner* — Alvin Tan
(74) *Attorney, Agent, or Firm* — Wolfe-SBMC

(57) ABSTRACT

In various example embodiments, a system and method for visual search and associated data decay models are presented. In one example embodiment, image history data associated with an output display of the machine is captured. The image history data is analyzed to identify groups of images associated with a plurality of events, and context information is identified that is associated with the plurality of events. One or more images for each event of the plurality of events is selected as a key image for an associated event as part of a plurality of key images, and a searchable event timeline index is generated. Key frames from an index of activities of one or more devices may then be displayed as part of a user search for information.

20 Claims, 10 Drawing Sheets

MEDIA DISCOVERY AND CONTENT STORAGE WITHIN AND ACROSS DEVICES

TECHNICAL FIELD

Embodiments of the present disclosure relate generally to visual search and recall systems for one or more computing devices, including content management for images associated with memory management.

BACKGROUND

Conventionally, a user interacts with a computing device in response to images presented on a display. During operation, a user provides input commands to a device, by a keyboard or mouse for example, and these inputs are used to generate a response on an output display. Search processes in such devices conventionally involve user text inputs and text responses that may or may not be associated with pictures or video media content. If a user is attempting to remember or recall a media event that was viewed on a device, text searches for file names or network file titles are frequently the only discovery method of searching for media content.

BRIEF DESCRIPTION OF THE DRAWINGS

Various ones of the appended drawings merely illustrate example embodiments of the present disclosure and cannot be considered as limiting its scope.

Figure 1:
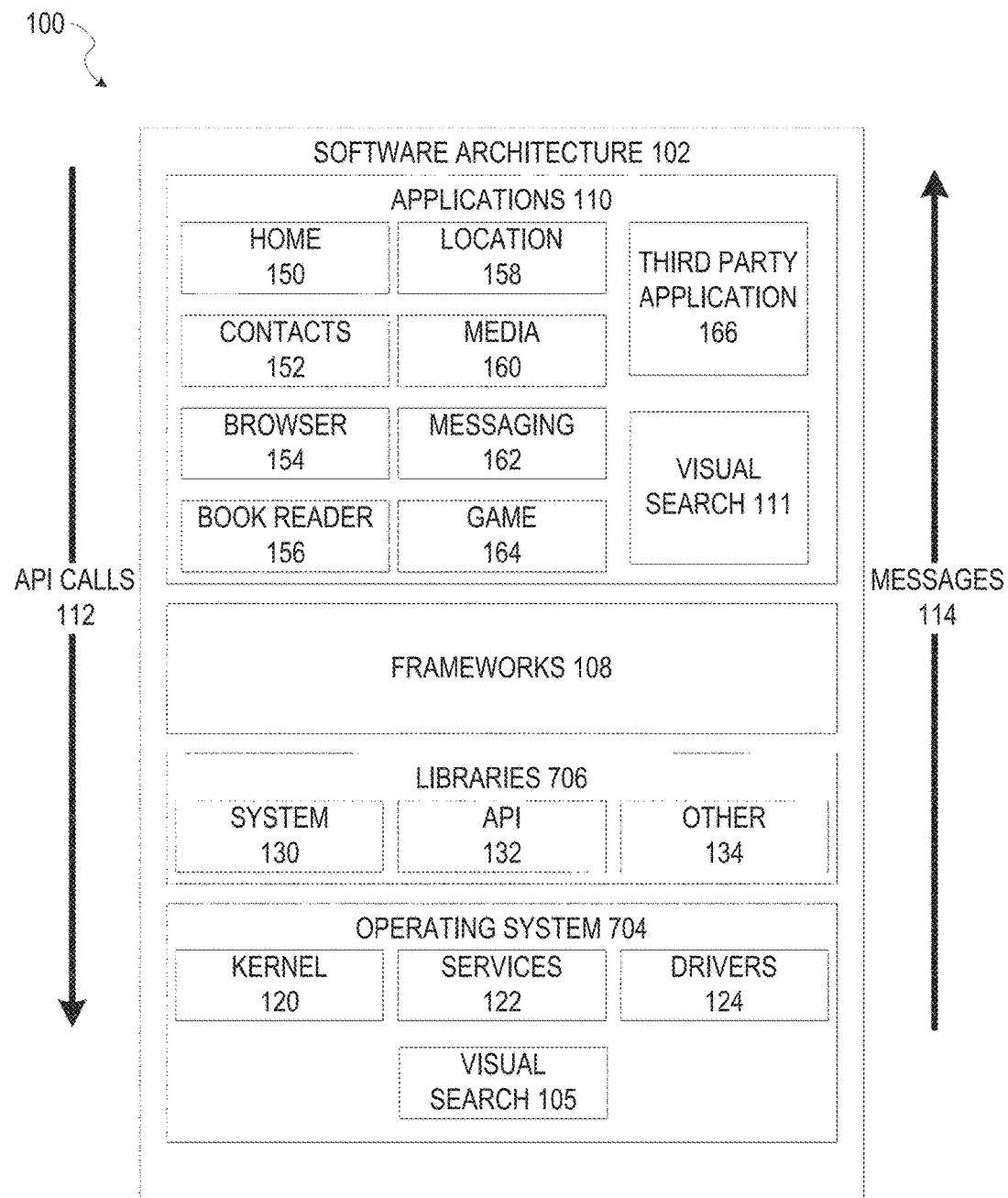
FIG. 1 is a block diagram illustrating an example of a software architecture that may be installed on a machine, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a visual search history is generated and used to create a searchable visual history timeline for one or more user devices, including a history of activities that occur within multiple distinct applications operating on the one or more devices. In certain embodiments, this can be achieved by storing images that are output to a display of a device as the device is in use by a user. Additional embodiments may store other information that is gathered from the device as it operates. All this information may be stored in a visual timeline that is searchable by a user. In certain embodiments, this may be considered as offering a 'rewind' button that allows a user to scroll back sequentially through previous actions or to select recorded instants from the timeline to search for information.

Such searching provides a benefit of leveraging a user's exact experience when the search for information was previously encountered in order to recover or find the information. Additionally, while many searches rely on a user reading or skimming text information, a timeline history as described herein includes images that are derived from the images that were initially displayed to a user. A large amount of information in image format may be processed as part of a user search. For example, certain users are able to view and distinctly recognize hundreds of images per minute, and to identify an image associated with searched-for information from images presented at these high rates. Embodiments herein rely on this capability of users, and the various embodiments structure image history data in a timeline to support this capability in a search format.

Additionally, embodiments provide the benefit of generating a searchable history across multiple applications. Many application environments operated on a device may be structured as self-contained, such that activities within the application are not exposed to search by system tools. This creates a segmented set of histories. Embodiments described herein gather information that is output to a display to generate a searchable history environment for all applications and actions on a device, including applications that are not structured to provide a history that is generally searchable with activities from other applications.

Even so, the amount of information generated by a visual search module that records every frame and pixel of images output on device displays during user operation will be very large, and greater than can be efficiently searched if all image frames are included and displayed as part of a timeline search. Various embodiments, therefore, include decay functions to filter and sort the information generated by the visual search module. Such a decay function may be, for example, a Bayesian belief network that is used to predict which images will be accessed or searched for in the future. The decay function may then be used to delete low interest images or move such images into a backup system. Low interest images as described herein refer to an image with low or redundant information content, or with information content that is determined by various analyses herein to not be of interest to a system user or users. In one embodiment, a decay function may be generated using information about which files and types of files that other users in a system access and how often a user accesses certain files.

As a specific example of one embodiment, a user may have a tablet device and a desktop device. The user may watch several videos and generate several e-mails and text messages on the tablet. The user may then switch to the desktop device, select music to be played on the desktop device, and then work on a presentation. All of the visual information presented on both the tablet and the desktop device will be stored by the visual search system. The system will process this image data to determine context information associated with each image. Such context information may be derived from each image, from other device processes operating during display of the particular image, or from other device user histories that are identified as having previously accessed similar content.

The decay function then uses this context information to reduce the amount of data recorded. For example, each video may be decayed to a point where only one to ten key images associated with the video remain, and each text message may have a single image that includes the final message and the message recipient. A cat video, for example, may be "decayed" such that a single representative frame of the video is stored, along with context information identifying the source of the video. Images associated with music selection and presentation generation may similarly be decayed to leave only a few images that represent major changes or key images associated with each. A display may present 60 frames per second to a user. Over the course of one hour, the user is presented with 216,000 frames. The decay function may reduce this to a smaller number of key frames (e.g., less than 100 frames) for inclusion in a timeline. The decay function may select such key frames based on context information from a history of file or content access by a user, general system settings, a history of file or content access by related other users, or other such context information. In one embodiment, this information is used to generate a probabilistic decision model such as Bayesian belief network that is used to determine which frames to keep. The process of selecting key frames may be recursive, in that as time goes on, key frames may be degraded as files associated with the key frames are not accessed, so that the key frames and the timeline index are updated over time.

When the initial key frames are identified using a decay model, the system may then generate a timeline index using the key frames. The timeline index stores the key frames in an index to associate the key frames with an event, where the key frame and the particular time value at which the key frame was captured are determined to be representative of the event by the decay model.

A user may then access a user interface to view the key images. For example, a user may select a time on a timeline, and the key image associated with that time will be displayed. The user may then search forwards or backwards along the timeline. Key images will be displayed in order along the timeline. The rate of image display may be a default value, or user adjustable. Additionally, information from the decay model may be used to highlight key frames associated with events that are determined by the model to have a higher probability of being searched-for images. The model may thus display certain images for a longer period of time, or provide highlight colors to higher probability key frames. Additionally, the visual search system may accept search inputs from a user to filter certain key images for display or emphasis for particular user searches.

Returning to the example above, in the embodiment where a user has watched multiple videos and worked on a presentation, a week later the user may wish to find a particular video, but the user is unable to find the video using text searches. The user may access a visual search interface, provide inputs to weight or filter the key images in the visual timeline, and select a best guess time for when the user accessed the video. The visual search module will then present key frames to the user. The user may thus review key frames at a high rate to search for the video. When the user identifies a key frame associated with the video, search result data identifying the source of the video will be presented to the user.

FIG. 1 is a block diagram 100 illustrating a representative software architecture 102, which may be used in conjunction with various hardware architectures herein described. In particular, software architecture 102 includes visual search 111 of applications 110, and visual search 105 operating within operating system 104. In various embodiments, aspects of visual search modules may be integrated with any aspect of software architecture 102 or any other software architecture. In certain embodiments, specialized visual search elements may also be part of libraries 106 or frameworks 108. Visual search 111 and visual search 105 may operate to implement the methods described herein, including gathering output frames as part of a user interface or output display of any aspect of software architecture. As part of this output frame capture, operating system 104 elements that are output to a display may be captured in output frames. Additionally, output information from any of applications 110 may be captured as output frames. This includes, for example, map information from location application 158, video or image information from media application 160, web page information from browser application 154, message information from messaging application 162, book page and illustration information from book reader application 156, game images from game application 164, or any other such information that is output to a display on which software architecture 102 is operating, including frames from home application 150, contacts application 152, and any other third party application(s) 166.

Visual search 111 includes systems or decay models as described herein for reducing the captured output frames to a number of selected key frames. Visual search 111 and visual search 105 also capture context information, either directly from any of applications 110 that are executed at any given time, or through analysis of the captured output frames. This may include character recognition, image recognition, or other such informational processing of the captured output frames. Context information may also be received via communication with a centralized server system or other devices, as described below. Visual search 111 may then manage the generation and presentation of a timeline index using the selected key frames and context information. Additional details of such processes and systems are detailed further below. For example, visual search 111 may be implemented, in one example, as device 800 of FIG. 8.

FIG. 1 is merely a non-limiting example of a software architecture and it will be appreciated that many other architectures may be implemented to facilitate the functionality described herein. The software architecture 102 may be executing on hardware such as machine 900 of FIG. 9 that includes, among other things, processors 910, memory 930, and I/O components 950. Executable instructions may be used to implement software architecture 102 on hardware such as machine 900, and may be used in implementation of the methods, modules and so forth of FIGS. 2-8. Hardware for software architecture 102 includes memory and/or storage modules, which also have executable instructions. A hardware layer for software architecture 102 may also comprise other hardware such as the other hardware illustrated as part of machine 900.

In the example architecture of FIG. 1, the software architecture 102 may be conceptualized as a stack of layers where each layer provides particular functionality. For example, the software architecture 102 may include layers such as an operating system 104, libraries 106, frameworks 108, applications 110 and a presentation layer. Operationally, the applications 110 and/or other components within the layers may invoke application programming interface (API) calls 112 through the software stack and receive a response, returned values, and so forth illustrated as messages 114 in response to the API calls 112. The layers illustrated are representative in nature and not all software architectures have all layers. For example, some mobile or special purpose operating systems may not provide frameworks 108, while others may provide such a layer. Other software architectures may include additional or different layers.

The operating system 104 may manage hardware resources and provide common services. The operating system 104 may include, for example, a kernel 120, services 122, and drivers 124. The kernel 120 may act as an abstraction layer between the hardware and the other software layers. For example, the kernel 120 may be responsible for memory management, processor management (e.g., scheduling), component management, networking, security settings, and so on. The services 122 may provide other common services for the other software layers. The drivers 124 may be responsible for controlling or interfacing with the underlying hardware. For instance, the drivers 124 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 106 may provide a common infrastructure that may be utilized by the applications 110 and/or other components and/or layers. The libraries 106 typically provide functionality that allows other software modules to perform tasks in an easier fashion than to interface directly with the underlying operating system 104 functionality (e.g., kernel 120, services 122 and/or drivers 124). The libraries 106 may include system libraries 130 (e.g., C standard library) that may provide functions such as memory allocation functions, string manipulation functions, mathematic functions, and the like. In addition, the libraries 106 may include API libraries such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 106 may also include a wide variety of other libraries 134 to provide many other APIs to the applications 110 and other software components/modules.

The frameworks 108 (also sometimes referred to as middleware) may provide a higher-level common infrastructure that may be utilized by the applications 110 and/or other software components/modules. For example, the frameworks 108 may provide various graphic user interface (GUI) functions, high-level resource management, high-level location services, and so forth. The frameworks 108 may provide a broad spectrum of other APIs that may be utilized by the applications 110 and/or other software components/modules, some of which may be specific to a particular operating system or platform.

The applications 110 includes built-in applications and/or third party applications 166. Examples of representative applications 110 may include, but are not limited to, a home application 150, a contacts application 152, a browser application 154, a book reader application 156, a location application 158, a media application 160, a messaging application 162, and/or a game application 164. Third party applications 166 may include any of the built-in applications as well as a broad assortment of other applications. In a specific example, the third party application 166 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In other embodiments, other operating systems such as Windows®, LINUX, MacOS, or other such desktop operating systems may also be used. In this example, the third party application 166 may invoke the API calls 112 provided by the mobile operating system such as operating system 104 to facilitate functionality described herein.

The applications 110 may utilize built-in operating system functions (e.g., kernel 120, services 122 and/or drivers 124), libraries 106 (e.g., system, APIs, and other libraries), and frameworks 108 to create user interfaces to interact with users of the system. Alternatively, or additionally, in some systems, interactions with a user may occur through a presentation layer. In these systems, the application/module "logic" can be separated from the aspects of the application/module that interact with a user.

Some software architectures utilize virtual machines. A virtual machine creates a software environment where applications/modules can execute as if they were executing on a hardware machine (such as the machine of FIG. 9, for example). A virtual machine is hosted by a host operating system (e.g., operating system 104 in FIG. 1) and typically, although not always, has a virtual machine monitor, which manages the operation of the virtual machine as well as the interface with the host operating system (i.e., operating system 104). A software architecture (e.g., software architecture 102) executes within the virtual machine such as an operating system, libraries, frameworks/middleware, applications and/or presentation layer. These layers of software architecture executing within the virtual machine can be the same as corresponding layers previously described or may be different.

Figure 8:
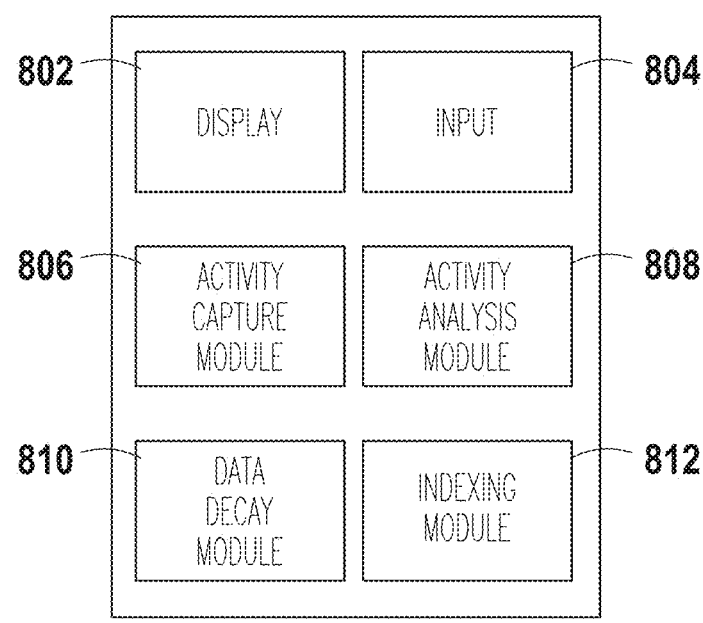
FIG. 8 illustrates aspects of a visual search system according to some example embodiments.

Device 800 of FIG. 8 illustrates one example embodiment of a system for virtual search. In certain embodiments, elements of software architecture 102 may be implemented in an embodiment of device 800. Particularly, in certain embodiments, aspects of visual search 111 and/or visual search 105 may be implemented using the modules of device 800. As illustrated by FIG. 8, device 800 includes a display 802, input 804, activity capture module 806, activity analysis module 808, data decay module 810, and indexing module 812. Additional elements of device 800 may be implemented using any other details described herein including details of software architecture 102 or machine 900.

Display 802 may be any visual output display as part of a device. For example, the display 802 may be any visual output similar to visual implementations of output components 952 described herein. Input 804 may similarly be any input device such as input components 954. In certain embodiments, display 802 and input 804 may be implemented as a single touchscreen display.

Activity capture module 806 comprises any combination of hardware, software, and/or firmware used to capture and record outputs of device 800. In certain embodiments as described above, this may be implemented as a system to capture output frames sent to the display 802. Such an activity capture module 806 may be implemented by capturing presentation layer information as it is sent to the display 802. This information may be stored as image frames within a device 800.

Activity analysis module 808 comprises any combination of hardware, software, and or firmware used to process or receive data as context information for activity captured by the activity capture module 806. For example, the activity analysis module 808 may process image frames stored by the activity capture module 806. This may include using any image recognition, character recognition, or machine learning analysis on the images in order to characterize the images for processing by the data decay module 810. In addition to generating context information by analyzing image frames, the activity analysis module 808 may additionally capture context information from applications that is used to generate output frames which are captured by the activity capture module 806.

For example, an application operating on the device 800 may provide an application name, an application process, filenames, network identifiers or uniform resource locators, or any other such information associated with or identifying information that is output to the display 802 as part of the operation of the application. Such information may be, in certain implementations, collected directly by the activity analysis module 808 rather than determined by image processing.

In still further embodiments, the activity analysis module 808 may gather information from networked resources that are related to images captured by the activity capture module 806, or applications used to generate such images. For example, the activity analysis module 808 may identify a uniform resource locator associated with an image frame stored by the activity capture module 806. Activity analysis module 808 may communicate with a server computer to receive context information about a file associated with this uniform resource locator. Such context information may be generated by the server computer receiving information about access patterns and usage by other users which are similar to a user of the device 800. Such context information may, for example be generated by other devices similar to device 800 with identifying details removed. Such anonymous information may then be gathered and used by the device 800 as part of a visual search system. The device 800 may similarly send details about file access patterns, usage, and decay patterns to such a remote server computer for use by other devices.

Data decay module 810 then gathers the image frames stored by the activity capture module 806 and the context information gathered by the activity analysis module 808 in order to generate a data decay model customized to usage patterns of a user of the device 800. The data decay module 810 may implement any state estimation model for probabilistic estimation of states associated with output frames. Certain embodiments, such as a fuzzy rules-based model or a Bayesian belief network model, may be generated using a combination of system settings, user history, and context information.

For example, in one potential embodiment, the data decay module 810 may be implemented using a Bayesian network. A Bayesian network, or belief network, shows conditional probability and causality relationships between variables. The probability of an event occurring given that another event has already occurred is called a conditional probability.

Bayes' Theorem is expressed as:

$$P(H|E, c) = \frac{P(H|c) \cdot P(E|H, c)}{P(E|c)} \quad (1)$$

where a belief in hypothesis H can be statistically estimated given the additional evidence E and the background information c. The left-hand term, P(H|E,c) is known as the "posterior probability," or the probability of H after considering the effect of E given c. The term P(H|c) is called the "prior probability" of H given c alone. The term P(E|H,c) is called the "likelihood" and gives the probability of the evidence assuming the hypothesis H and the background information c is true. Finally, the last term, P(E|c), is called the "expectedness", or how expected the evidence is given only c. It is independent of H and can be regarded as a marginalizing or scaling factor.

Bayes's Theorem can be rewritten as $$P(E|c) = \sum_i P(E|H_i, c) \cdot P(H_i|c) \quad (2)$$

where i denotes a specific hypothesis Hi, and the summation is taken over a set of hypotheses which are mutually exclusive and exhaustive (i.e., their prior probabilities sum to 1). The probabilities expressed are conditional and specify the degree of belief in some proposition or propositions based on the assumption that some other propositions are true. As such, the theory has no meaning without prior determination of the probability of these previous propositions.

Such probabilities of previous propositions may be based on history information associated with a particular user, history information associated with other users, default search assumptions, and other likelihood information. All of this information may thus be used as context information for probabilities used in a model. Chains of such probabilities may then be joined in a Bayesian network. The Bayesian network may be used to analyze both multiple frames associated with a single event to estimate one or more frames that are likely to be identified with the event as key frames that are characteristic of the event. The Bayesian network may also be used to estimate how likely an event is to be searched for by a user based on prior history data associated with searches for similar events by the user or other users.

An "event" as referred to herein is a set of output frames that are logically related as part of one or more user actions. For example, display of a single continuous video may be considered a single event, or continuous scenes within a video may be considered an event. An event may also be considered a base set of data which is likely to be searched for individually by a user. Each event will cover a period of time and have one or more output frames associated with the event.

The data decay module 810 may be used to limit the number of frames associated with an individual event by selecting key frames that represent an event out of all of the output frames of data associated with an event as well as to delete or remove other non-key frames to a backup storage. The data decay module 810 may also be used to determine when a particular event is unlikely to be searched for by a user, and to then to delete or remove the key frames associated with the event. The data decay module 810 thus performs a process over time where, as output frames and key frames are determined to be less and less relevant to a user, the number of frames of data stored for an event are reduced over time as the data decay module 810 gathers more information and frames for a particular event are not accessed or searched for.

In certain embodiments, the activity capture module 806, activity analysis module 808, and data decay module 810 may be implemented as a single module. In other embodiments, different implementation structures may be used with additional numbers of modules. In certain embodiments, the initial selection of key frames and the decay and removal of key frames over time may be implemented as separate modules rather than as a single data decay module 810.

The indexing module 812 then receives key frames from the data decay module 810 and places the key frames in a timeline index. The indexing module 812 may then be used as part of a search process to implement a visual search. Embodiments of an interface for such a visual search are described in FIGS. 5-7. Additionally, as described above, key frame information stored in a history index as part of the indexing module 812 may be subject to periodic or triggered processing by the data decay module 810. Key frames indexed by the indexing module 812 may thus be removed or "decayed" as time passes without the key frames being accessed based on subsequent application of an updated decay model to new key frames captured by operation of the system and old key frames stored as part of the indexing module 812.

Figure 2:
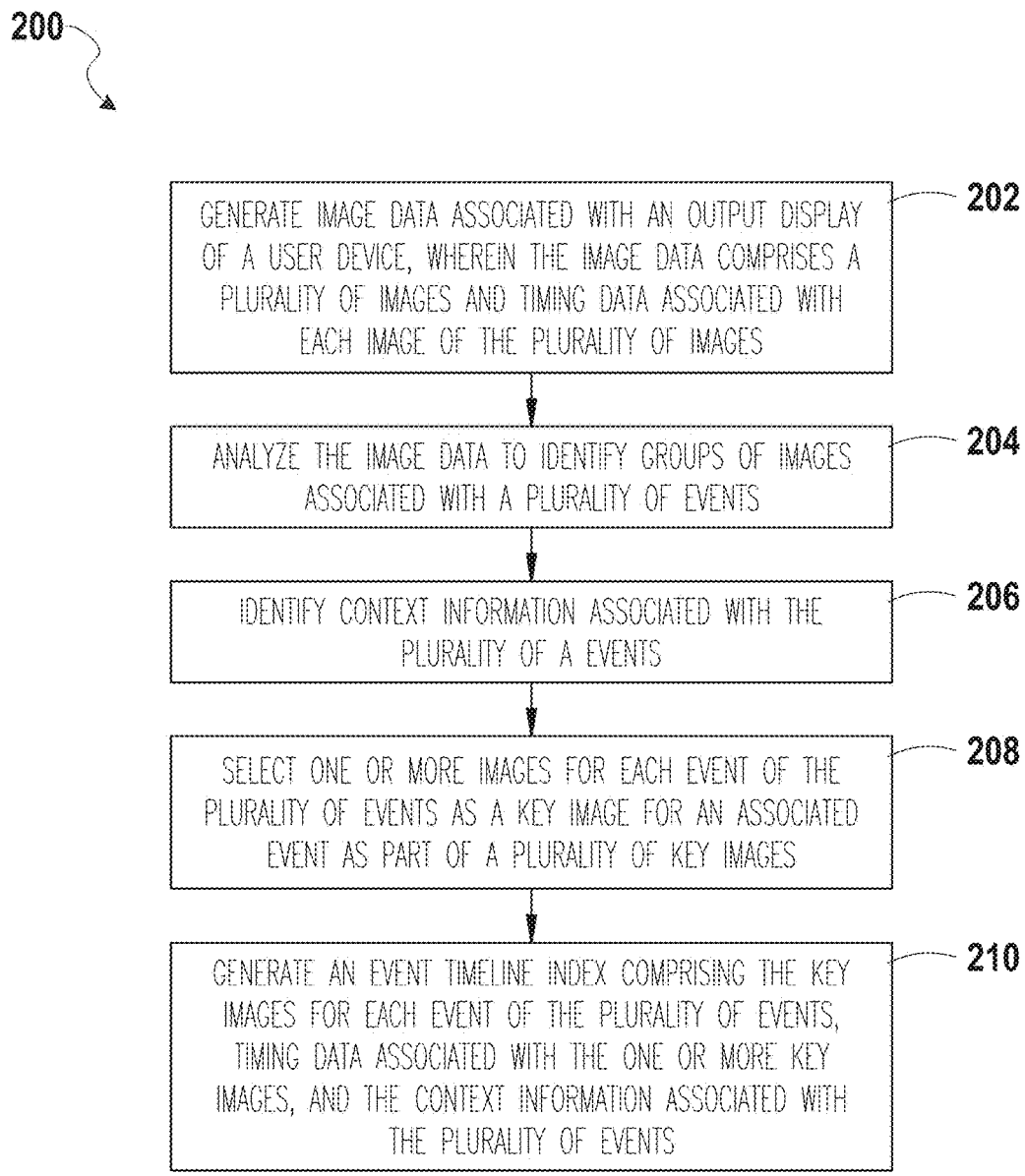
FIG. 2 is a flow diagram illustrating a method according to some example embodiments.

FIG. 2 includes a flow diagram illustrating a method 200 according to some example embodiments. While the method 200 may be performed using various different devices, for the purpose of illustration, the method 200 is described in the context of device 800 of FIG. 8, machine 900 of FIG. 9, and software architecture 102 of FIG. 1. The method 200 may further be performed using a processor and a memory in a device or machine such those discussed below as part of machine 900.

As shown by FIG. 2, the method 200 includes operation 202, which involves capturing, using one or more processors 910 of a device 800, image data associated with an output component 952 display or the display 802 of the device 800, wherein the image data comprises a plurality of images and timing data associated with each image of the plurality of images. The image data is captured using an activity capture module 806, which captures the information generated by an operating system 104 and/or one or more applications 110 for output using the display 802. Such capture may be implemented using a visual search 105 element of an operating system 104 to intercept pixel data generated for output using a display layer of software architecture 102. In other embodiments, such a visual search 105 element may be implemented purely in the presentation layer as part of a visual search 111 application.

Operation 204 then involves analyzing the image data to identify groups of images associated with a plurality of events. Operation 206 further involves identifying context information associated with the plurality of events. Such analysis may be performed by the activity analysis module 808. As described above, such analysis may use character recognition systems, image recognition systems, system history, data directly from a source of the image such as any application 110, data from a third party system, or any other such information to analyze the images captured by the activity capture module 806. Events may be identified by using the above information to select or determine a start time and an end time for an event, with all frames during the event time period from the start to the end associated with the event.

Operation 208 involves selecting one or more images for each event of the plurality of events as a key image for an associated event as part of a plurality of key images. Selection of key images may be performed using the data decay module 810 as described above. In various embodiments, the data decay module 810 may select key images from images stored in a memory of the device 800, and may either delete the remaining non-key images from the memory, may move the remaining non-key images to a backup storage memory, or may simply flag the non-key images for removal when a predetermined memory usage threshold for history data images in a visual search application is exceeded.

Operation 210 then involves generating an event timeline index comprising the key images for each event of the plurality of events, timing data associated with the one or more key images, and the context information associated with the plurality of events. Such an event timeline index may be generated using the indexing module 812. Such an index may be generated as a linked list, referencing memory locations of key frames identified by the data decay module 810. Such an index may alternatively be implemented as a table, or any other such database or memory storage format that is accessible for display of key frames during presentation of a visual search interface such as those shown in FIGS. 5-6.

Figure 3:
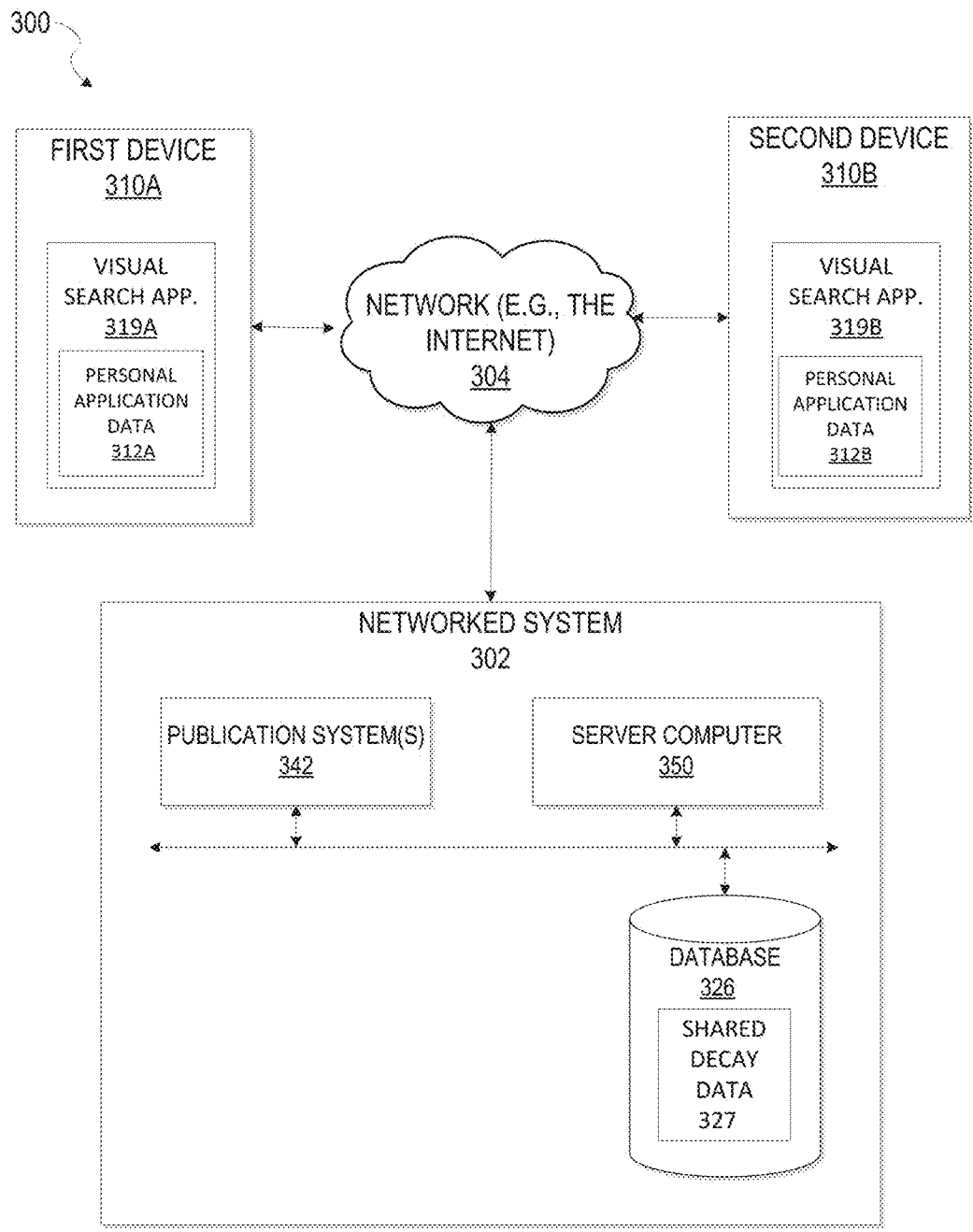
FIG. 3 is a block diagram illustrating a network which may be used with some example embodiments.

FIG. 3 is a block diagram illustrating a network architecture of a system 300 for implementing visual search using multiple devices. The system 300 includes a first device 310*a*, second device 310*b*, and a networked system 302, which may communicate with each other through a network 304. In various embodiments, the network 304 and communications associated with the network 304 are similar to communications described with respect to the network 980 of FIG. 9 below. The first device 310*a* and the second device 310*b* may be any device described herein.

As mentioned above, multiple devices may be used in various embodiments described herein in different ways. In the first set of embodiments, multiple devices may be associated with a single user. In such embodiments, a visual search application 319*a* and visual search application 319*b* are both associated with a single user and/or user account. As a user uses both devices 310*a* and 310*b*, a history index is generated that includes key images for events that occur on both devices 310*a*, 310*b*.

For example, a first history index may be generated just as described above for first device 310*a*. A second history index may then be generated for events occurring on the second device 310*b*, where both sets of events are associated with a single user. The devices 310*a*, 310*b* may then communicate with each other and/or with the networked system 302 to merge the first and the second history indexes into a single visual search index. This may involve sharing an index outline with key frames stored remotely, or may involve creation of search indexes including key frames on multiple devices. Once the first and second history indexes are merged, the user may search for events that occurred using either device 310a, 310b. Similarly, any other device connected to the network 304 and having access to a user's account may be configured to receive the merged history index, and to search for events that occurred on the first device 310a or second device 310b using the merged history index and associated key frames.

In other embodiments, multiple devices may be used to share context information or other history information that may be used as part of a decay model. For example, first device 310a may be associated with a first user, and second device 310b may be associated with a second user. In such an embodiment, personal application data 312A will be associated with a different user than personal application data 312B. Such data may be shared directly with other users in order to improve the decay model that is used as part of a visual search system as described above.

In other embodiments, a server computer 350 may store information for multiple users in a database 326 as part of shared decay data 327. The shared decay data 327 may be user history or context information generated as part of the operation of visual search applications 319a, 319b on the devices of different users. The shared decay data 327 may have identifying information removed, but may maintain sufficient information to determine when the shared data is relevant to the decay model of a particular user. The shared decay data 327 may then be sent to a user's device for use by a visual search application 319a, 319b in generating a decay model.

Devices and network components operating as part of the network 304 and networked system 302 may include any access point hardware, networking hardware, or communication device described herein which may be used to relay information between devices 310a, 310b and the networked system 302.

The networked system 302 includes a publication system (s) 342 and a server computer 350. The publication system (s) 342 and the server computer 350 access data stored in database 326, which stores user data, application data, and device security data. The data pertaining to the user account may be stored as one or more records in the database 326. As described above, certain embodiments may store shared decay data 327 as anonymous or partially anonymous data. In other embodiments, the data pertaining to the user account may include identifying information as part of a user account where the data may be shared with other devices associated with a user or otherwise approved for data sharing by the user account. In such embodiments, an account of shared decay data 327 includes data identifying the user (e.g., the user's first and last names, phone number, billing and shipping address(es), and Social Security Number (SSN), whether the user is a frequent buyer, whether the user is also a vendor or a seller, etc.), transaction data (e.g., the name of a purchased product, a product identifier, the date of transaction, the price, the condition of the product, etc.), user demographic data (e.g., age, gender, financial information, family status, employment status, etc.), purchase history data, return history data, product review data, etc. The shared decay data 327 may also include the user's login information such as user name and password.

In various embodiments, using the networked system 300, the server computer 350 may act as a remote server implementing a portion of a visual search system. In some embodiments, for example, aspects of visual search applications 319a, 319b or any visual search described herein may be implemented as a web service or as a distributed application operating partially on a user's device and partially on the server computer 350 of the networked system 302. Further, in such embodiments, visual search may be implemented with information shared between a visual search system and a publication system(s) 342 that may include sales information, text search information, e-commerce information, or any other such information that may be either merged into a history timeline or used to improve a decay model.

Figure 4:
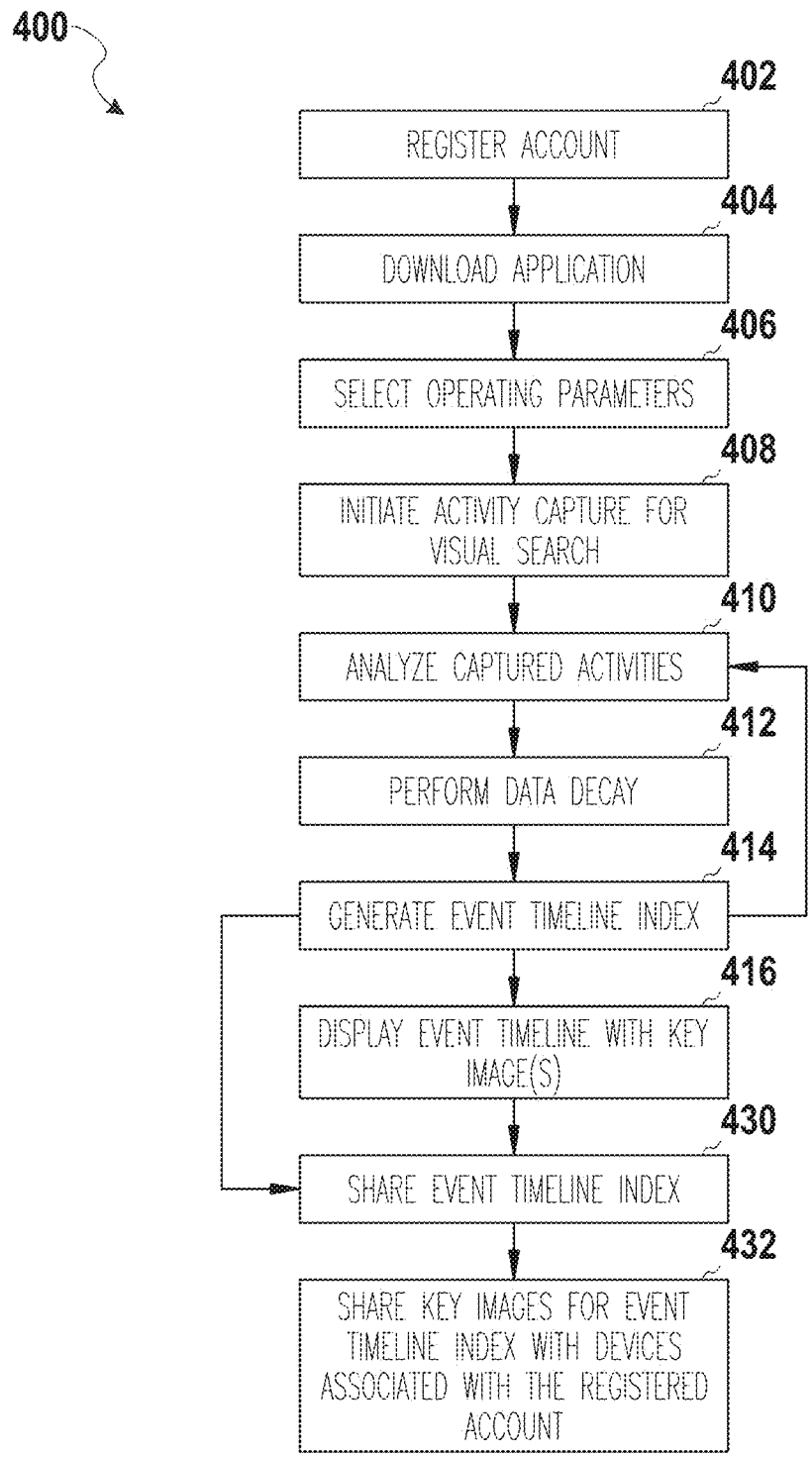
FIG. 4 is a flow diagram illustrating a method according to some example embodiments.

FIG. 4 describes another method according to certain embodiments described herein. Method 400 begins with operation 402 where a user registers an account. Such registration may be performed by a user device in communication with the server computer 350. As part of registration, multiple devices may be associated with an account such that a history index will be generated from activity on multiple devices and merged into a single history index as described above. In operation 404, each device associated with the account registered and receives a copy of the visual search applications such as visual search 111.

In operation 406, a user selects operating parameters to be associated with the user's account. This may be done via an application such as visual search 111. This may also be done via communication with the server computer 350, either as part of the initial registration process or at any time during use of the visual search system.

In operation 408, capture of activity for a visual search system is initiated. Such capture may be initiated for a user input received as part of operation of a visual search 111 application. Such capture may also be automatically initiated in response to operating parameters that are either selected or associated by default with a visual search system selected by a user.

In operation 410, the captured activities are analyzed. As described above, this analysis may include segmenting the captured data into separate events. This may also include analyzing images for context information. This may also include analysis for generation of a decay model.

In operation 412, the captured data has a data decay process applied to filter out unnecessary or unwanted data. As described above, capture of activities in operation 410 may involve large amounts of video or other image data. Data decay performed as part of operation 412 may reduce the amount of data stored by several orders of magnitude. The exact amount of data reduction will depend on the decay model used and various operating parameters selected by a user or by default system settings.

In operation 414, an event timeline index is generated. As described above, such a history index will be associated with one or more key frames for each event in the event timeline index. During system operation, the system will continue to capture image data associated with activities on one or more user devices. As part of this process, the event timeline index will be updated using captured activities from operation 410 as analyzed by subsequent instances of operation 412. This process of updating the event timeline index in operation 414 may be continuous, such that updates are made in near real-time as the output image frames are captured from a user device as they are displayed on a user device. In other embodiments, such updates to the event timeline index at operation 414 may occur periodically or in a triggered fashion based on the availability of processing resources. In certain embodiments, operating parameters selected in operation 406 may include resource thresholds for updating an event timeline index. Such settings may enable a user to determine how frequently an event timeline index is updated, or may set battery thresholds below which the event timeline index is paused or shutdown.

Figure 5:
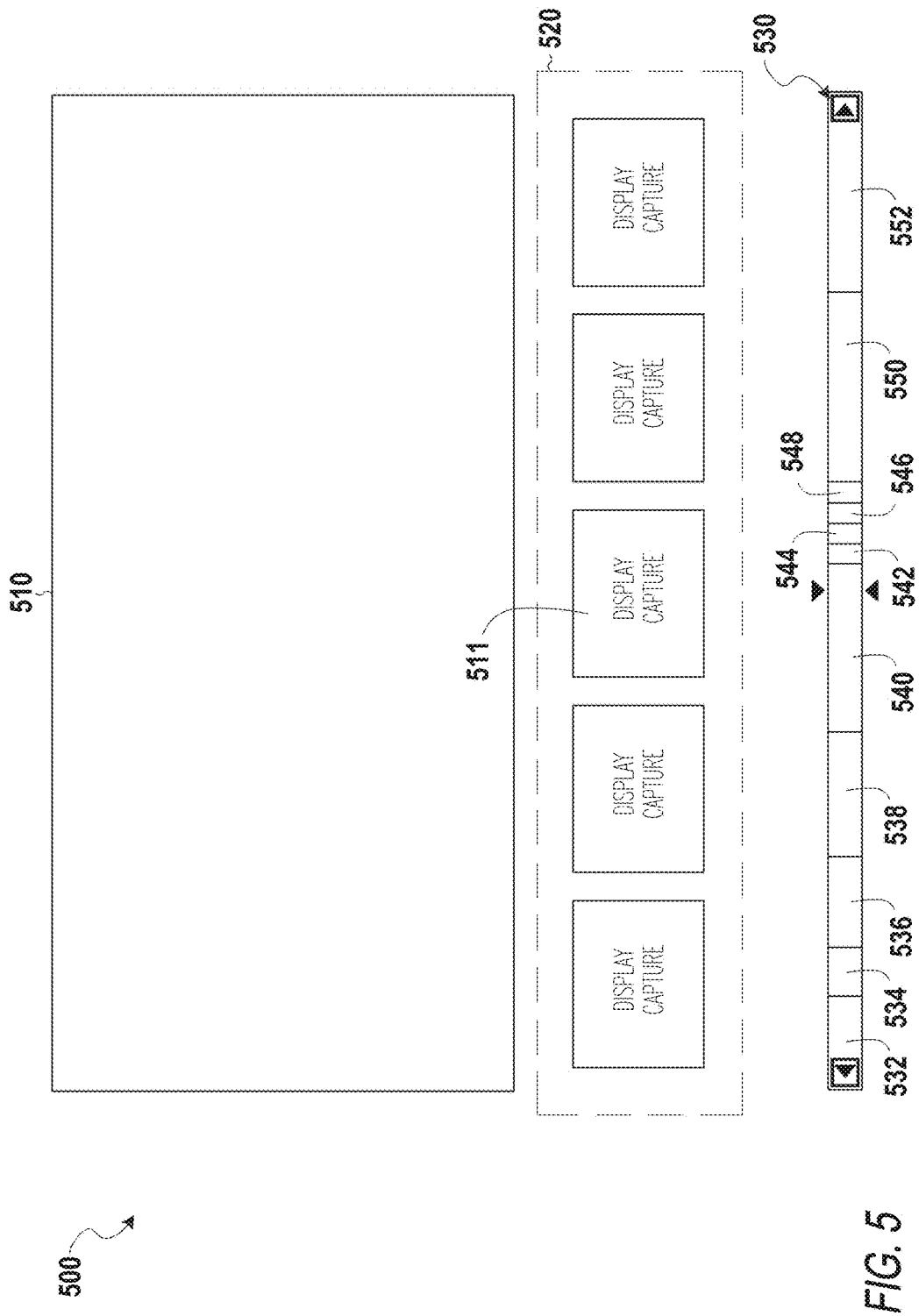
FIG. 5 illustrates a user interface according to some example embodiments.
Figure 6:
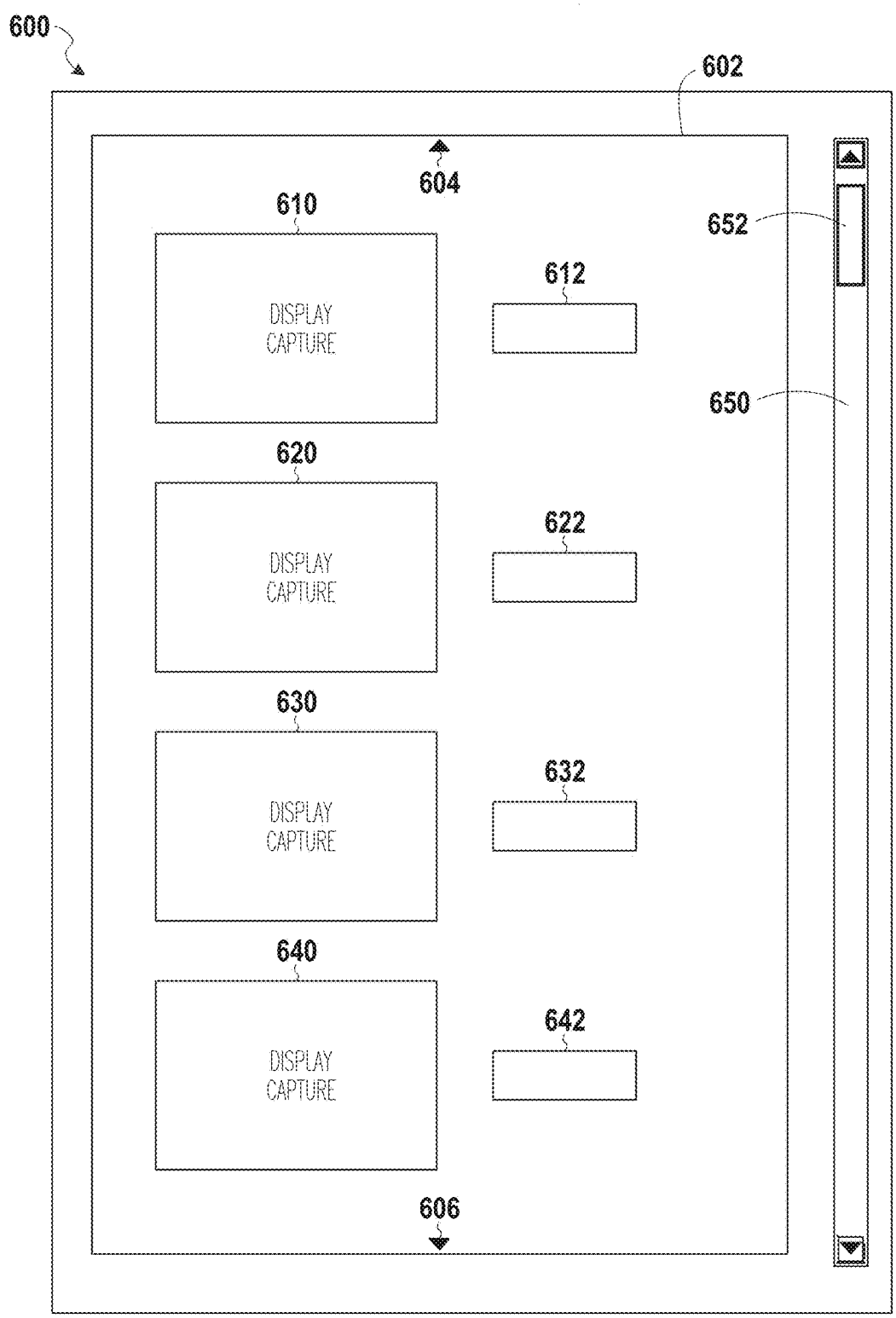
FIG. 6 illustrates a user interface according to some example embodiments.

In operation 416, a user initiates a search process using the event timeline index. Such a process involves display of a user interface and a representation of the event timeline index generated in operation 414. Examples of display of an event timeline with key images are illustrated by FIGS. 5, 6, and 7B. Display of the event timeline may further be associated with user inputs and search parameters which are used to scan through the event timeline index and key frames associated with times of events in the event timeline index in order to assist the user in finding searched-for information.

In operation 430, the event timeline index may be shared either with other devices or with a remote server such as the server computer 350. In operation 432, key images are communicated. Similar to resource limitations described for operation 414, operating parameters selected in operation 406 may determine when event timeline index information and associated key images are sent using network resources. In various embodiments, key images may be integrated with an event timeline index such that images are communicated with the event timeline index. In other embodiments, text outline information of an event timeline index may be communicated separately, with more resource-intensive key images sent separately, depending on system operating parameters.

FIGS. 5 and 6 each illustrate a user interface according to some example embodiments. FIG. 5 shows user interface 500. User interface 500 includes a displayed key frame area 510, a key frame scroll area 520, and a timeline interface 530. In certain embodiments, when a user selects an option or device for display of an event timeline such as in operation 416, the user interface 500 is displayed.

The timeline interface 530 represents at least a portion of the timeframe represented by an event timeline index. In certain embodiments, a visual indicator may show individual events within the timeline interface 530. In the example of the user interface 500, events 532, 534, 536, 538, 540, 542, 544, 546, 548, 550, and 552 are all represented as individual events. Each event will have at least one key frame associated with the event at some point in time. As an event history timeline is updated and processed using a decay model, events which are determined to have a low probability of access may have their key frames removed in order to conserve memory within the system. In such embodiments, the timeline interface 530 may continue to represent the existence of the event, but may include an indicator showing that the key frames associated with the event have been removed. In such embodiments, text information representing the event may be retained and may be displayed in key frame area 510 if the event is selected by a user.

The timeline selection indicator 590 indicates a current point in the timeline selected for display on the key frame area 510. An initial placement of the timeline selection indicator 590 may be selected by a user via an input device of the machine that is presenting the user interface 500 on an output of the machine. The timeline selection indicator 590 may also have a default initial placement on the timeline interface 530. In one embodiment, the timeline selection indicator 590 is initially placed at the most current point on the timeline interface 530.

A key frame scroll area 520 then displays multiple key frames, which are images captured as they were output on a display during device operation. In the embodiment shown in the user interface 500, a center display capture area 511 of the key frame scroll area 520 includes the key frame which is displayed in key the frame area 510.

As a user initiates a search through the event timeline index, the timeline selection indicator 590 will move across the timeline interface 530, either forwards in time or backwards in time depending on the user search selection. As this occurs, key frames will scroll across the key frame scroll area 520, with the key frame in center display capture area 511 being the key frame associated with the time in the timeline indicated by the timeline selection indicator 590. This key frame will also be displayed in the key frame area 510. Thus, the time-sequential key frames will scroll across the key frame scroll area 520, with large copies of each key frame displayed for a short period of time in the key frame area 510.

In certain embodiments, a fixed number of frames may be displayed in the key frame area 510 for a given amount of time. For example, a device may be configured to display key frames per minute in the key frame area 510. In certain embodiments, as described above, information from a decay model may be used to determine that certain key frames have a higher probability of being searched for than other key frames. In such embodiments, higher probability key frames may be emphasized with color or image enhancements as part of a display of the user interface 500. In other embodiments, higher probability key frames may be emphasized with a display time adjustment. For example, rather than each of the 120 key frames per minute receiving 0.5 seconds in the key frame area 510, higher probability images may each receive 0.7 seconds and lower probability images may each receive 0.3 seconds. Display times may be weighted based on user settings and exact probabilities determined by a Bayesian belief network or other decay model. In still further embodiments, key frames with a probability below a certain threshold may not be displayed, even if the key frames are still available for display in the user interface 500.

If a user identifies a searched-for image, a user may make a user interface action such as a mouse click on the key frame area 510. The system will then record the search selection and use this information to update the user history information. This information may then be fed back into the decay model. This information may also be shared with a remote server, such as the server computer 350, where it may be used in the decay models of other users' devices.

FIG. 6 illustrates another example user interface shown as user interface 600. The user interface 600 includes a data display area 602 and a timeline interface 650. The data display area 602 displays a number of key frames 610, 620, 630, and 640. These key frames 610 through 640 are associated with a portion of a history timeline indicated by a displayed timeline indicator 652. Similar to the user interface 500, user interface 600 receive a the user input that causes the key frames displayed in the display area 602 to progress through the key frames in an event history timeline either forwards or backwards in time sequentially. In the user interface 600, progressing up, as illustrated by arrow 604, moves backwards in time through key frames of the event history index. Progressing down, as illustrated by the arrow 606, moves forwards in time through key frames of the event history index. As key frames scroll across the data display area 602, the timeline indicator 652 will move along the timeline interface 650.

In addition to key frames, the data display area 602 also includes key frame text associated with each key frame. The user interface 600 thus includes key frame text 612, 622, 632, and 642. Such key frame text 612-642 may include identifying information or other details associated with a corresponding key frame. Key frame text 612 is associated with key frame 610, key frame text 622 is associated with key frame 620, key frame text 632 is associated with key frame 630, and key frame text 642 is associated with key frame 640.

Key frame text associated with a particular key frame may be derived from metadata associated with a key frame, text, or image recognition information generated by an analysis of a key frame which may be performed, for example, by the activity analysis module 808. Key frame text may additionally be derived from analysis or event history indexes of other users which may be received from a remote server such as server computer 350. In certain embodiments, key frame text may identify third party sources of key frame text. Additionally, if more key frame text is associated with a particular key frame than is presentable within an associated area as illustrated by the user interface 600, the data decay model may be used to select the most relevant key frame text for a particular user. Such key frame text may be stored as part of an event history index by the indexing module 812.

Additionally, just as above for the user interface 500, with reference to the user interface 600, a data decay module 810 may use a data decay model to determine key frames which are more probable or less probable as key frames being searched for by a user. Key frames determined to be more probable search targets by a data decay model may be highlighted, or a scroll speed may be reduced when such high-probability key frames are within the display area 602.

While user interface 500 and user interface 600 illustrate two embodiments of visual search interfaces, it will be apparent that other implementations are possible within the scope of the innovations described herein. Additionally, as described above, additional embodiments of user interfaces for visual search may include a search interface. Such a search interface may provide search filters for information stored within an event timeline index. For example, a search interface may accept search terms. The search terms may be used to determine key frames and associated key frame text for display. In other words, certain key frames may be filtered out of the presentation of key frames in a user interface based on search terms. For example, if a user types in the term "cat video," all non-video events may be filtered from display within a user interface during that particular search.

An additional embodiment for a search interface may provide summary information about the content of an event timeline index; for example, such a search interface may include a distribution of the types of events identified by activity analysis module 808. For example, the search interface may summarize a percentage of entries in an index that are associated with a particular category such as video, word processing, presentation, or other such event types. The user interface may further allow certain categories of events to be selected for search such that only key frames associated with a particular event type will be displayed in a user interface during a search.

Figure 7A:
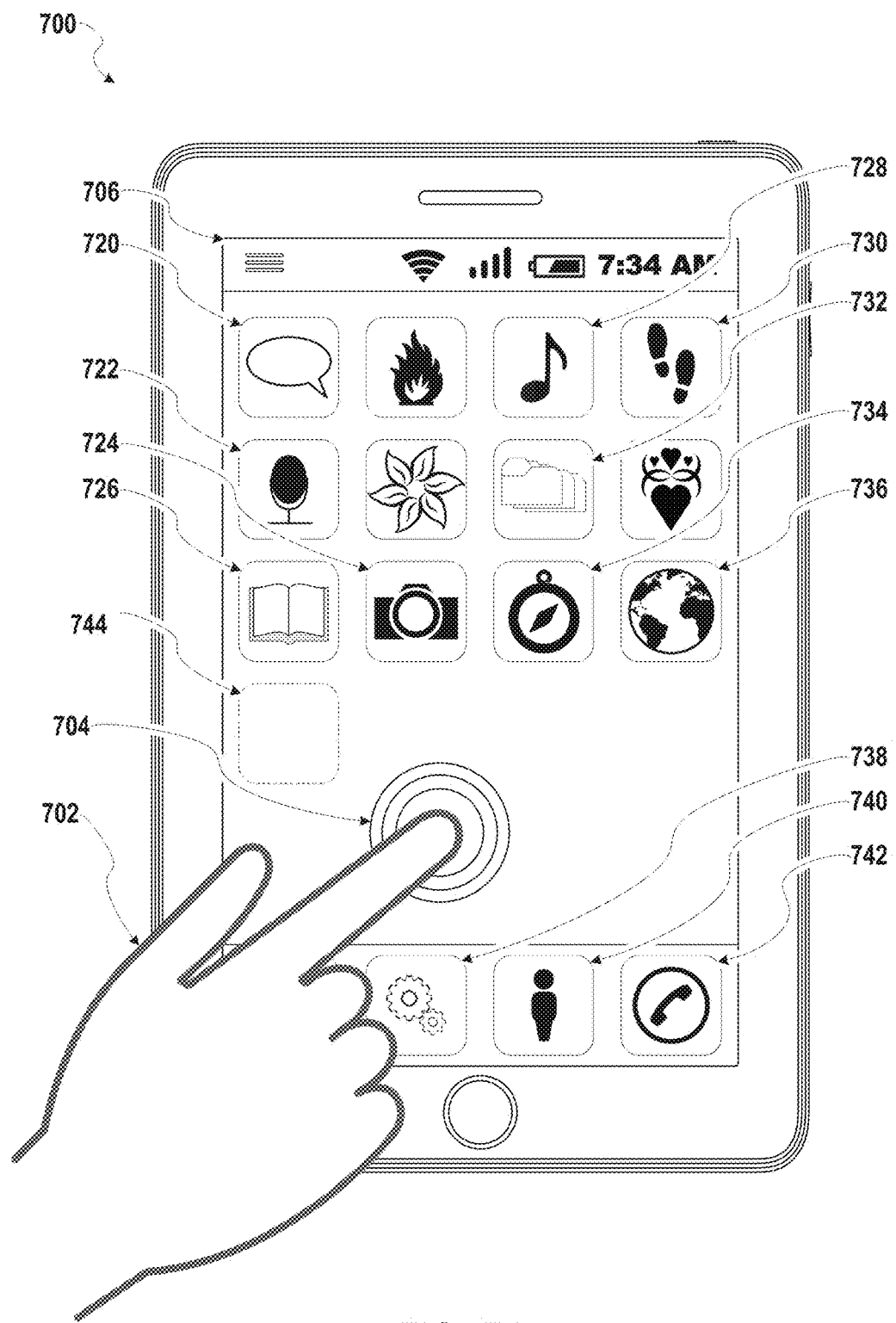
FIG. 7A illustrates a representation of a machine in the form of a mobile device within which a set of instructions may be executed for causing the machine to perform any one or more of the methodologies discussed herein, according to some example embodiments.
Figure 7B:
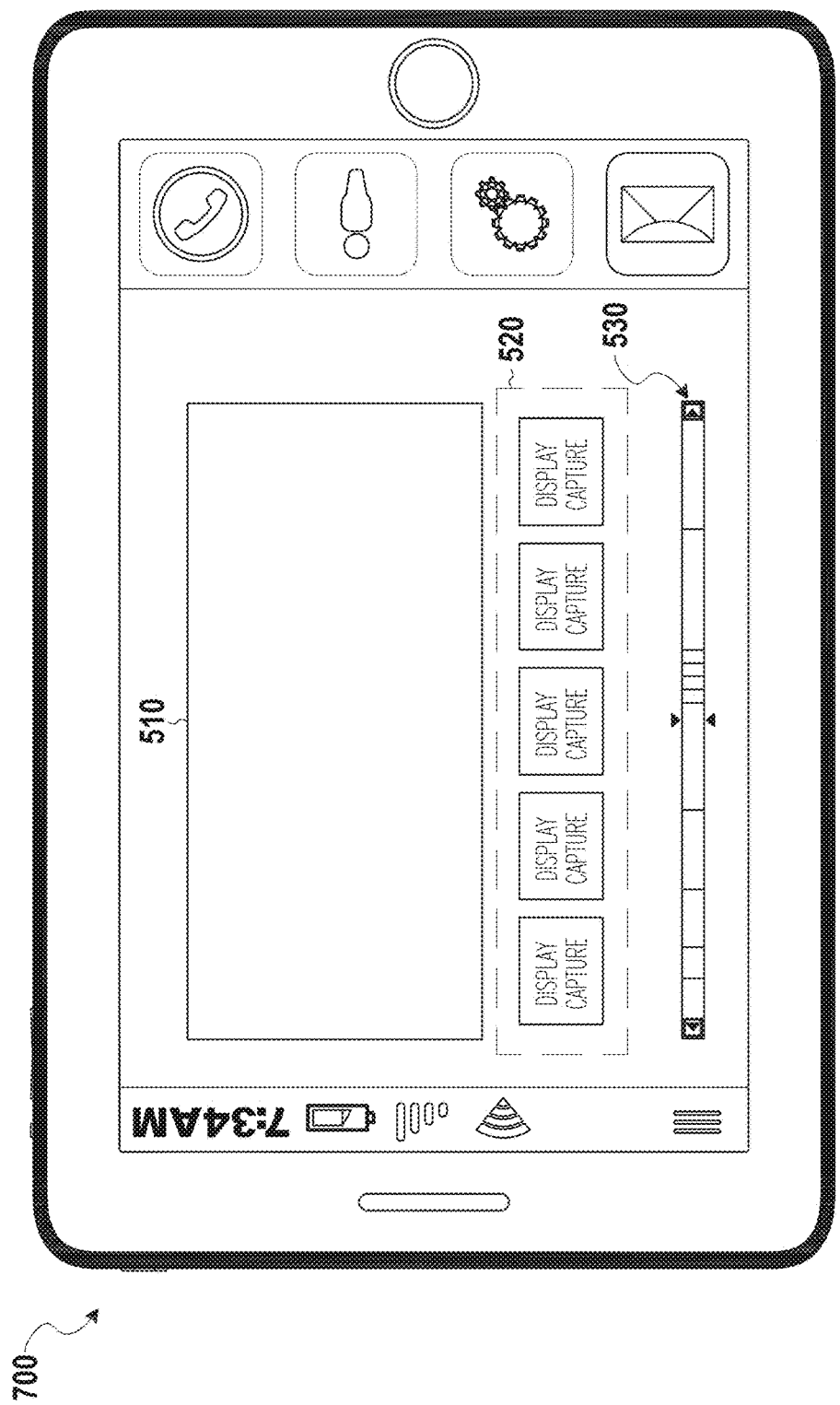
FIG. 7B illustrates a representation of a machine in the form of a mobile device having an output display which may be used with any one or more of the methodologies discussed herein, according to some example embodiments.

FIGS. 7A and 7B depict an example mobile device and mobile operating system interface, according to some example embodiments. FIG. 7A illustrates an example mobile device 700 that may be executing a mobile operating system (e.g., iOS™, Android™, Windows® Phone, or other mobile operating systems), according to example embodiments. In certain embodiments, the software architecture 102 may be implemented on the mobile device 700 and the device 800, and first device 310a and second device 310b may be implemented as embodiments of the mobile device 700. In one embodiment, the mobile device 700 may include a touchscreen that may receive tactile information from a user 702. For instance, the user 702 may physically touch 704 the mobile device 700, and in response to the touch 704, the mobile device 700 may determine tactile information such as touch location, touch force, gesture motion, and so forth. In various example embodiments, the mobile device 700 may display a home screen 706 (e.g., Springboard on iOS™) that the user 702 of the mobile device 700 may use to launch applications and otherwise manage the mobile device 700. In various example embodiments, the home screen 706 may provide status information such as battery life, connectivity, or other hardware status. The home screen 706 may also include a plurality of icons that may be activated to launch applications, for example, by touching 704 the area occupied by the icon. Similarly, other user interface elements may be activated by touching 704 an area occupied by a particular user interface element. In this manner, the user 702 may interact with the applications.

Many varieties of applications (also referred to as "apps") may be executing on the mobile device 700. The applications may include native applications (e.g., applications programmed in Objective-C running on iOS™ or applications programmed in Java running on Android™), mobile web applications (e.g., HTML5), or hybrid applications (e.g., a native shell application that launches an HTML5 session). In a specific example, the mobile device 700 may include a messaging app 720, audio recording app 722, a camera app 724, a book reader app 726, a media app 728, a visual search app 730, a file management app 732, a location app 734, a browser app 736, a settings app 738, a contacts app 740, a telephone call app 742, other apps (e.g., gaming apps, social networking apps, biometric monitoring apps), a third party app 744, and so forth.

A visual search application 730 may, in certain embodiments, be an application downloaded to the device 800 from the server computer 350 as part of operation 404 described above. The visual search application may 730 implement any method described herein related to capture of image data, generation of an event timeline index, and presentation of key frames as part of a timeline index as described with respect to user interfaces 500 and 600 or any other such interface.

FIG. 7B illustrates a user interface similar to user interface 500 implemented within mobile device 700 as part of the operation of a visual search application. The interface illustrated by FIG. 7B includes the displayed key frame area 510, the key frame scroll area 520, and the timeline interface 530. These elements may be used to present key frames generated during operation of mobile device 700, and may, in certain embodiments, enable a user (e.g., user 702) to review activity that was presented on the display of the mobile device 700 using rewind and search functions to present key frames within the display area 511.

Additionally, as described above, a merged index may be created, such that the key frames presented in key frame area 510 may not only be derived from image data presented on mobile device 700, but also on other devices associated with a user. For example, a user may view a presentation on a desktop computer, and then weeks later may search an event timeline index on the mobile device 700 that includes key frames from the presentation that was viewed earlier on the desktop computer. When the user identifies the key frame associated with the searched-for presentation, the key frame may have associated key text or other context information that is accessible by selecting the key frame by, for example, using a touchscreen interface of the mobile device 700 to select the key frame when it is displayed in the key frame area 510. The user may then be presented with context or key frame text such as a file name, a file source, a presentation name, a date and time associated with the event when the presentation was originally viewed on the desktop computer, other users that have viewed the presentation, third party information about the generation and modification of the presentation, viewing patterns of third parties related to the presentation, or any other such information.

Additionally, when the key frame is selected by a user, the selection is used as feedback information for the decay model, and probabilities associated with future selection of the event or a file associated with the event are adjusted. As described above, this feedback may be incorporated by decay models associated with a particular device such as mobile device 700, with all devices associated with a particular user or user account, or may be used by a server as shared decay data to influence decay models of similar users of a visual search system.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described herein are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 9:
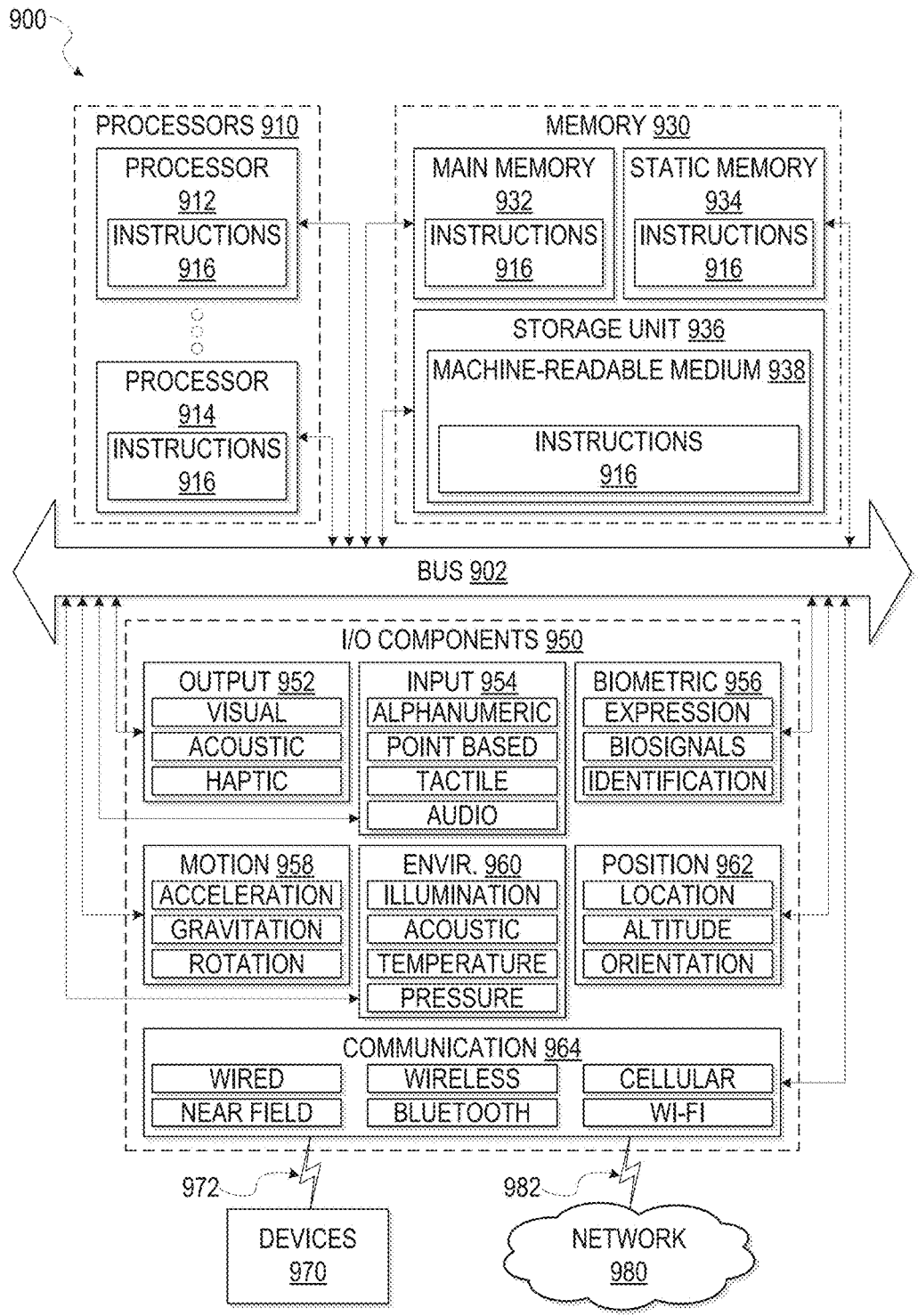
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute the flow diagrams of FIG. 2 or 4. Additionally, or alternatively, the instructions 916 may implement visual search 111, visual search 105, visual search applications 319a-b, or modules 806-812 of FIG. 8, and so forth. The instructions 916 transform the general, non-programmed machine into a particular machine programmed to carry out the described and illustrated functions in the manner described.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include a multi-core processor that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core process), multiple processors with a single core, multiple processors with multiples cores, or any combination thereof.

The memory 930 may include a main memory 932, or other memory storage, and a storage unit 936, both accessible to the processors 910 such as via the bus 902. The storage unit 936 and main memory 932 store the instructions 916 embodying any one or more of the methodologies or functions described herein. The instructions 916 may also reside, completely or partially, within the main memory 932, within the storage unit 936, within at least one of the processors 910 (e.g., within the processor's cache memory), or any suitable combination thereof, during execution thereof by the machine 900. Accordingly, the main memory 932, the storage unit 936, and the memory of processors 910 are examples of machine-readable media.

As used herein, "machine-readable medium" means a device able to store instructions (e.g., instructions 916) and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9.

The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   capturing, using a processor of a machine, image history data associated with an output display of the machine, wherein the image history data comprises a plurality of images and timing data associated with each image of the plurality of images;
   analyzing the image history data to identify groups of images associated with a plurality of events;
   identifying context information associated with the plurality of events;
   selecting one or more images for each event of the plurality of events as a key image for an associated event as part of a plurality of key images;
   generating an event timeline index comprising the key image for each event of the plurality of events, timing data associated with the one or more key images, and the context information associated with the plurality of events; and
   determining, using the processor of the machine, a usage history associated with each event;
   wherein selecting one or more key images comprises:
      applying a decay function to each image of the plurality of images; and
      selecting each image of the plurality of images that is not decayed by the decay function as a key image; and
   wherein the decay function is based on the usage history associated with each event.

2. The method of claim 1, wherein the decay function is generated using a Bayesian belief network.

3. The method of claim 1, wherein selecting one or more key images for each event of the plurality of events comprises:
   identifying, using first context information of the context information, a first representative image associated with a first event, wherein the first representative image is selected from a first plurality of images associated with the first event.

4. The method of claim 3, wherein the first context information comprises text data generated using optical character recognition on each image of the first plurality of images.

5. The method of claim 3, wherein the first context information comprises object data generated using object recognition on each image of the first plurality of images.

6. The method of claim 3, further comprising:
   generating, using the first context information, one or more event identifiers for the first event, wherein the one or more event identifiers are generated using the first plurality of images associated with the first event.

7. The method of claim 6, further comprising:
   receiving, from a network server computer, a first set of network usage history associated with at least a first identifier of the one or more event identifiers;
   wherein the decay function is based on the first set of network usage history.

8. The method of claim 7, further comprising:
   generating, by the processor of the machine, a first user profile associated with a first user of the machine;
   communicating the first user profile to the network server computer; and
   wherein the first set of network usage history is generated by the network server computer based on network usage history for a plurality of users.

9. The method of claim 1, wherein a number of selected key images associated with a first event of the plurality of events is less than a number of images of the plurality of images by at least a factor of 100.

10. The method of claim 1, further comprising:
    displaying a first timeline associated with the event timeline index on an output display of the machine;
    displaying a timeline indicator on the first timeline, wherein the timeline indicator identifies a first time of the timing data;
    displaying a first key image associated with the first time;
    receiving, at an input device of the machine, a first input adjusting the timeline indicator to a second time; and
    displaying a second key image associated with the second time.

11. The method of claim 10, further comprising:
    receiving, at an input device of the machine, a first replay input; and
    in response to the first replay input, sequentially displaying a set of displayed key images of the plurality of key images in reverse order based on the timing data associated with each image.

12. The method of claim 11, wherein the images are displayed at a rate greater than two hundred images per minute.

13. The method of claim 11, wherein a display time value associated with each image of the set of displayed images is generated based on a usage history for each event of the plurality of events that corresponds with each image of the set of displayed images.

14. The method of claim 10 further comprising:
determining, for each key image of the plurality of key images, a relevancy value based on a decay function;
displaying the first key image with a first color indicator associated with a first relevancy value; and
displaying the second key image with a second color indicator different than the first color indicator, wherein the second image is assigned a second relevancy value different than the first relevancy value.

15. A device for visual search comprising:
an output display;
memory; and
processing circuitry coupled to the memory and the output display and configured to:
generate image history data associated with the output display of a user device, wherein the image history data comprises a plurality of images and timing data associated with each image of the plurality of images;
analyze the image history data to identify groups of images associated with a plurality of events and further configured to identify context information associated with the plurality of events;
select one or more images for each event of the plurality of events as a key image for an associated event as part of a plurality of key images; and
generate an event timeline index comprising the key image for each event of the plurality of events, timing data associated with the one or more key images, and the context information associated with the plurality of events; and
determine a usage history associated with each event;
wherein selecting one or more images as the plurality of key images comprises:
applying a decay function to each image of the plurality of images; and
selecting each image of the plurality of images that is not decayed by the decay function as a key image; and
wherein the decay function is based on the usage history associated with each event.

16. The device of claim 15 further comprising:
a touch input configured to receive input commands to the device;
wherein the plurality of images comprises images of a user interface associated with the touch input captured at an operating system level of the device; and
wherein the processing circuitry is further configured to capture at least a portion of the context information from input commands received at the touch input and from input response data used to generate a user interface output on the output display.

17. A non-transitory computer readable medium comprising computer readable instructions that, when executed by a processor, cause a first device to:
generate image history data associated with an output display of a user device, wherein the image history data comprises a plurality of images and timing data associated with each image of the plurality of images;
analyze the image history data to identify groups of images associated with a plurality of events;
identify context information associated with the plurality of a events;
select one or more images for each event of the plurality of events as a key image for an associated event as part of a plurality of key images;
generate an event timeline index comprising the key image for each event of the plurality of events, timing data associated with the one or more key images, and the context information associated with the plurality of events;
determine a usage history associated with each event;
wherein the selection of one or more images as the plurality of key images comprises operations to:
apply a decay function to each image of the plurality of images; and
select each image of the plurality of images that is not decayed by the decay function as a key image; and
wherein the decay function is based on the usage history associated with each event.

18. The non-transitory computer readable medium of claim 17 wherein the instructions further cause the first device to:
receive, from a second device, a second event timeline index comprising second device key images associated with a first user account, wherein the first device is further associated with the first user account;
update the event timeline index with the second event timeline index to generate a multi-device event timeline index; and
sequentially display, in response to a user input, a second plurality of images from the multi-device event timeline index associated with both the event timeline index and the second event timeline index.

19. The non-transitory computer readable medium of claim 17 wherein the instructions further cause the first device to:
identify, using first context information of the context information, a first representative image associated with a first event, wherein the first representative image is selected from a first plurality of images associated with the first event.

20. The non-transitory computer readable medium of claim 17 wherein the instructions further cause the first device to:
generate, using the first context information, one or more event identifiers for the first event, wherein the one or more event identifiers are generated using the first plurality of images associated with the first event; and
process a first set of network usage history from a server computer, the first set of network usage history associated with at least a first identifier of the one or more event identifiers;
wherein the decay function is further based on the first set of network usage history.

* * * * *